(12) United States Patent
Vallone

(10) Patent No.: US 8,504,942 B2
(45) Date of Patent: Aug. 6, 2013

(54) ICON-BASED FACILITATION OF SERVICE TASK PERFORMANCE

(76) Inventor: Anthony Vallone, North Canton, OH (US)

( * ) Notice: Subject to any disclaimer, the term of this patent is extended or adjusted under 35 U.S.C. 154(b) by 668 days.

(21) Appl. No.: 12/347,673

(22) Filed: Dec. 31, 2008

(65) Prior Publication Data

US 2009/0172595 A1    Jul. 2, 2009

Related U.S. Application Data

(60) Provisional application No. 61/018,191, filed on Dec. 31, 2007.

(51) Int. Cl.
*G06F 3/048* (2006.01)
(52) U.S. Cl.
USPC ............................ 715/810; 715/809; 715/811
(58) Field of Classification Search
USPC .......................................... 715/810, 811, 809
See application file for complete search history.

(56) References Cited

U.S. PATENT DOCUMENTS

| | | | | |
|---|---|---|---|---|
| 5,016,170 | A * | 5/1991 | Pollalis et al. ................ | 705/7.15 |
| 5,442,746 | A * | 8/1995 | Barrett ........................... | 715/854 |
| 6,678,714 | B1 * | 1/2004 | Olapurath et al. ............ | 718/104 |
| 6,954,737 | B2 * | 10/2005 | Kalantar et al. ................ | 705/50 |
| 2002/0087382 | A1 * | 7/2002 | Tiburcio ........................... | 705/9 |
| 2003/0050801 | A1 * | 3/2003 | Ries et al. ........................ | 705/2 |
| 2003/0088534 | A1 * | 5/2003 | Kalantar et al. ................ | 706/50 |
| 2004/0019513 | A1 * | 1/2004 | Colalancia et al. ............ | 705/9 |
| 2005/0137928 | A1 * | 6/2005 | Scholl et al. .................... | 705/9 |
| 2006/0168530 | A1 * | 7/2006 | Muller et al. .................. | 715/751 |
| 2006/0173785 | A1 * | 8/2006 | Behbehani ...................... | 705/54 |
| 2007/0250784 | A1 * | 10/2007 | Riley et al. .................... | 715/764 |
| 2008/0195946 | A1 * | 8/2008 | Peri-Glass .................... | 715/715 |
| 2008/0209417 | A1 * | 8/2008 | Jakobson ....................... | 718/100 |
| 2009/0204471 | A1 * | 8/2009 | Elenbaas et al. ................. | 705/9 |

FOREIGN PATENT DOCUMENTS

| | | | |
|---|---|---|---|
| JP | 03065731 A | * | 3/1991 |
| JP | 2002288406 A | * | 10/2002 |

* cited by examiner

*Primary Examiner* — William Bashore
*Assistant Examiner* — Gregory A Distefano
(74) *Attorney, Agent, or Firm* — Cooper Legal Group LLC

(57) ABSTRACT

The performance of service tasks on behalf of individuals (such as clients) among agents in a service industry, such as a home healthcare services industry or a lodging service industry, may be difficult due to the quantity, variety, and details of such service tasks. A service task facilitator device may be devised that facilitates the performance of service tasks by such agents in a convenient manner. A service task coordinating system may also be devised for coordinating the performance of service tasks among such agents through the administration of such service task facilitator devices. The service task facilitator devices and coordinating system communicate with users (including agents) through a lexicon of icons of predominantly pictorial form chosen to describe the nature and details of the service tasks within the service industry. The use of a lexicon of pictorial icons facilitates such communication in an easily recognizable and language-independent manner.

18 Claims, 8 Drawing Sheets

US 8,504,942 B2

ICON-BASED FACILITATION OF SERVICE TASK PERFORMANCE

PRIORITY CLAIM

This patent application claims priority under 35 U.S.C. §119(a), inter alia, to U.S. Patent Application No. 61/018,191, filed Dec. 31, 2007, also entitled "Icon-Based Facilitation of Service Task Performance."

BACKGROUND

The service industries of modern economies are heavily based on the performance of service tasks on behalf of clients. As one example, assistance of daily living (ADL) services, such as home healthcare provision for individuals with various disabilities, involve the performance of daily living activities for the individual, comprising both personal tasks (e.g., helping the individual bathe, dress, and take medication) and environmental tasks (e.g., cleaning the individual's residence and washing the individual's laundry.) As another example, lodging services, such as hotels, models, and hostels, involve the performance of both guest tasks (e.g., room cleaning, food service, and valet services) and institution tasks performed on the collective behalf of many individuals (e.g., security details and laundry services.)

In many service industries, the service tasks to be performed are of many and different types that involve different sets of resources. Service tasks may also involve the performance of various portions of the service at different times and/or locations, and may also be recurring and periodic. Moreover, the service tasks may involve teams of individuals working together in similar or different roles (e.g., food service involves an order-taker, a cook, and a food delivery person.)

Due to the complexity and variety of service tasks that may be involved in a service industry, facilitating and tracking the performance of various service tasks may be difficult.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure relates to the facilitation of the performance of service tasks for a service industry based on icons of predominantly pictorial form, which together comprise a predominantly pictorial lexicon for describing the nature and details of the service tasks within the service industry and the performance thereof on behalf of individuals. This facilitation may comprise a device for storing a service task set, and for displaying various icons representing service tasks to be performed by one or more agents on behalf of one or more individuals. The device may also be configured to store a service task annotation that further describes the service task (e.g., where the service task comprises providing medication, and the service task annotation states that the medication should be taken in conjunction with a second medication.) The device may also be configured to receive and to store input indicating the performance of the service task and the details thereof (e.g., "task was performed," or "task was not performed," or "task was partially performed.") The device may also be configured to receive a performance annotation related to the performance of the service task (e.g., a keyboard for accepting user input from an agent related to the service task, or a sensor configured to detect whether a machine performed the service task), and a performance annotation memory configured to store the performance annotation.

A device of this nature may also be configured to communicate with a coordinating system configured to coordinate the performance of the service tasks among one or more devices used by one or more agents, and the communication may involve receiving service tasks from the coordinating system and/or sending the information representing the performance of the service tasks to the coordinating system (with or without related performance annotations.) The coordinating system may also present the information to various users according to the icons of predominantly pictorial form, thereby improving the consistency and efficiency with which the service task information is presented by the system and devices to users thereof. Many other variations of these concepts may be devised, and some examples are presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DEFINITIONS

Figure 1:
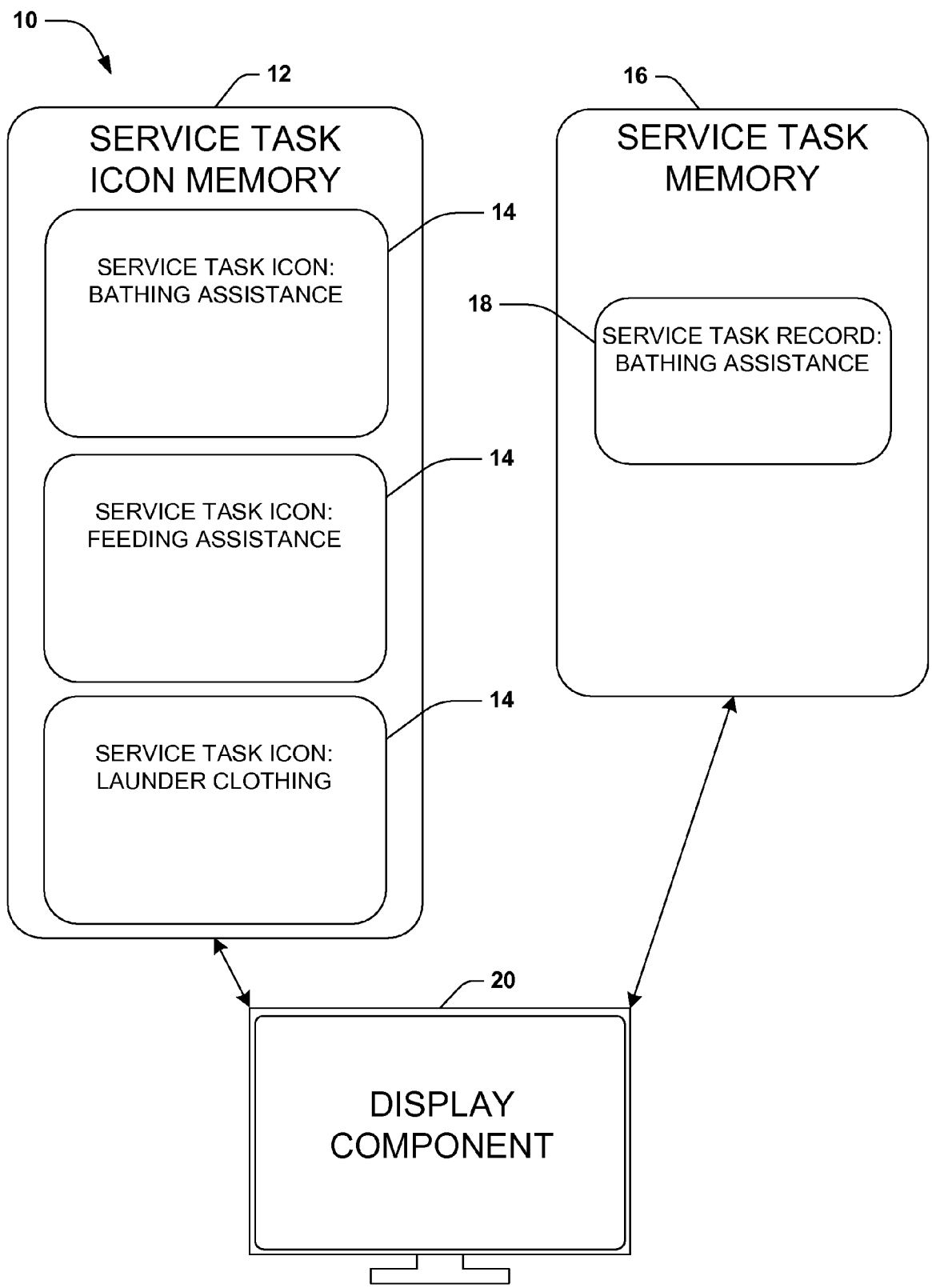
FIG. 1 is a component block diagram of an exemplary service task facilitator device configured to facilitate performance of service tasks.

The following terms used herein are suggested to have the following meanings. This is not intended as an exhaustive list of defined terms, but only as an interpretive aide for facilitating the reading and comprehension of the disclosure described herein. The definitions provided herein are intended to be coupled with the other sources of interpretive guidance for these terms, such as context, common usage in the field of art, and ordinary usage in the English language.

"Agent" is suggested to mean a person or device involved in the performance of a service task on behalf of an individual, such as a healthcare patient, a customer, a client, or a guest. Such agents may include a professional or employee who bears a duty of fulfilling all or part of the service task. Such agents may also include the individual on whose behalf the service is to be performed. Such agents may also include a machine, such as a medical device configured to record a vital sign of an individual at a particular time. Such agents may also comprise a combination of agents, such as a team of professionals working together with some machines and the individual on whose behalf the service is provided. The agents may be uniquely specified (e.g., a particular individual), or specified as one or more of a few uniquely specified agents (e.g., one of the following individuals), or specified by a distinguishing trait such as a role (e.g., a nurse) or a characteristic (e.g., anyone who is professionally licensed to provide a service), or generically specified (e.g., any agent.)

"Computer-executable instruction" is suggested to mean an instruction selected from an instruction set that is able to operate a computer to achieve a desired functional result. The desired functional result may be simple, such as the storage of a value in memory, or complex, such as an invocation of an advanced programming interface (API) call that produces sophisticated functionality. The instruction set may be any suitable computer-executable instruction set, including (without limitation) a native machine architecture language, machine language, Java, JavaScript, BASIC, Visual BASIC, C, C++, C#, FORTRAN, Perl, a command shell scripting language, etc. The instruction set may be declarative, such as HTML; imperative, such as C; a hybrid language; another type of instruction set; etc. The instruction set may be fully compiled, such as into a machine-executable binary; partially compiled into an intermediate language that is subsequently fully compiled; interpreted from text, etc. The instruction may be executed natively on a processor; through a parser, advanced programming interface (API), or in a virtual machine; within another application or process, such as a web browser; etc. The details are not important, so long as the instruction is able to operate a computer to achieve the desired functional result.

"Computer-readable medium" is suggested to mean a computer-operable component capable of transmitting stored data to a computer. The medium may be comparatively static, such as a solid-state storage device, or comparatively volatile, such as system RAM. The medium may be a set of hardware components, such as one or more registers or capacitors; may comprise a fixed medium, such as a platter in a hard disk drive; may comprise a removable medium, such as a CD-ROM in a CD-ROM drive; etc. The medium may be read-only; write-only; both readable and writable; etc. The medium may be read-once; read-many; write-once; write-many; etc. The medium may be accessible in any suitable fashion, such as randomly; sequentially; either randomly or sequentially; etc. The medium may be dedicated to a particular computer or device; may be simultaneously connected to and shared by multiple computers or devices; may be shared over a network; etc. The medium may store the data in any electronic medium, such as electronic, magnetic, optical, print, etc. The medium may be used to store data for a single task or application; may be used to store data for many tasks and applications; etc. The implementation of the medium is not important, so long as the medium is computer-operable and capable of transmitting stored data to a computer.

"Data representation" is suggested to mean data stored in a memory and/or computer-readable medium that represents or describes, in whole or in part, a concept or object. The concept or object so represented may be a tangible item, such as a person; or an abstract concept, such as a specific mathematical value; or a computer-operable object, such as an image. "Data representation" is particularly suggested to mean image data, which a computer may use to render a specific image.

"Healthcare" and "healthcare service" are suggested to mean a service provided to a recipient of healthcare that relates to the health, functionality, and/or physical and/or mental well-being of the recipient. Such services may derive from one or several of the myriad recognized fields of healthcare, including, for instance, allopathic medicine, osteopathic medicine, physical and/or occupational therapy, dentistry, chiropractic medicine, hospice or home healthcare, and pharmaceuticals.

"Icon" is suggested to mean a graphic symbol and/or word whose word form represents and/or suggests its meaning.

"Icon set" is suggested to mean a set of icons that together represent some common features of a particular service industry.

"Individual" is suggested to mean a recipient of services provided by one or more agents. In the case of self-administered services, the individual may also be the sole agent for performing the service, or may be one of several agents for performing the service.

"Logic" is suggested to mean a set of computer-executable instructions configured to operate a computer in order to achieve a desired result.

"Memory" is suggested to mean a computer-operable component capable of storing and/or retrieving data. The memory may be comparatively static, such as a solid-state storage device, or comparatively volatile, such as system RAM. The memory medium may be a set of hardware components, such as one or more registers or capacitors; may utilize a fixed medium, such as a platter in a hard disk drive; may utilize a removable medium, such as a CD-ROM in a CD-ROM drive; etc. The memory may be read-only; write-only; both readable and writable; etc. The memory may be read-once; read-many; write-once; write-many; etc. The memory may be accessible in any suitable fashion, such as randomly; sequentially; either randomly or sequentially; etc. The memory may be dedicated to a particular computer or device; may be simultaneously connected to and shared by multiple computers or devices; may be shared over a network; etc. The memory may store the data in any computer-accessible medium, such as electronic, magnetic, optical, print, etc. The memory may be used to store data for a single task or application; may be used to store data for many tasks and applications; etc. The implementation of the computer-operable component is not important, so long as the computer-operable component is capable of storing and/or retrieving data.

"Service industry" is suggested to mean an industry with a predominant or at least significant service component, e.g., where service tasks are often performed on behalf of individuals in the context of the service industry.

"Service task" is suggested to mean a task to be performed on behalf of one or more individuals in the context of a service industry. The service tasks may be applied directly to the individual (e.g., assisting an individual with eating), or may be performed on behalf of the individual (e.g., cleaning an individual's residence.) The service tasks may also be performed for one or more specific individuals (e.g., facilitation with personal hygiene), or on the collective behalf of many individuals (e.g., security detail services to protect all of the guests of an institution.)

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Many service industries are based in whole or in part the performance of services on behalf of individuals, such as clients, patients, residents, etc. As one example, service tasks in an assisted daily living (ADL) service industry may comprise, e.g., personal tasks, such as hygiene tasks with which the individual requires assistance, and environmental tasks, such as cleaning the individual's residence and laundering the individual's clothing. As another example, service tasks in a lodging industry may comprise, e.g., guest tasks, such as in-room food service, and institutional tasks, such as security detail tasks performed on the collective behalf of the individuals.

The performance of such service tasks may be made difficult due to the variety of individuals who may be involved, the resources that may be required to perform the service task, and the time and day on which the service task is to be performed. Moreover, a service task may involve multiple sub-tasks to be performed at different times or by different individuals. The service task may also be conditional (e.g., assist an individual with eating if the individual is hungry), or may involve special details (e.g., assist an individual with bathing in consideration of a particular disability.) Furthermore, tracking the performance of such varied service tasks across a service industry, by a wide variety of employees in various roles and on behalf of various individuals, may be very difficult. Many service industries depend on the complete and accurate performance of many such service tasks for client satisfaction and retention and the continued viability of the service industry.

The present disclosure presents techniques for facilitating the performance of service tasks in view of the variety and complex details related thereto. The technique may involve a service task facilitator device configured to facilitate the performance of service tasks on behalf of individuals. The technique may also involve a service task coordinating system configured to coordinate the performance of service tasks through the use of service task facilitator devices. Other techniques and variations thereof are also presented herein.

The techniques described herein involve the use of icon sets that illustrate concepts relating to the service tasks performed in the context of the service industry, where such icons are presented of a predominantly pictographic form that is easy for users of such techniques to recognize and comprehend. The present disclosure also relates to a method of facilitating the performance of service tasks in such service industries through the use of devices that communicate with users through icons of predominantly pictorial form comprising such an easily recognizable lexicon.

The use of icon sets of predominantly pictorial form for communicating service-task-related information has many potential advantages. First, the user may comprehend and communicate with devices and systems utilizing such icon sets in a language-independent manner. Pictographic icons can be used to circumvent differences in language capabilities and skill levels among various users. The icon set may be cognizable to individuals with limited literacy skills or with mental faculties, such as very young, elderly, and mentally handicapped individuals.

Second, if a common set of service task icons is utilized by many users and individuals, it may become a standard and standardized lexicon for the communication of service task information. Regular and frequent exposure to the same icon set, especially from a variety of sources, may lead to quicker, fuller, and more accurate recognition and comprehension by users of devices and systems configured to display these icons while representing the illustrated concepts. Moreover, widespread exposure to and use of the same icon set may improve the speed, depth, and precision of communication of service task information among many agents and individuals.

In view of the advantages of an icon-based lexicon for service industries, a device may be devised that utilizes icons of predominantly pictorial form to communicate with users in order to facilitate the performance of service tasks. A device of this nature may comprise a service task icon memory configured to store at least one service task icon of predominantly pictorial form representing at least one service task, a service task memory configured to store at least one service task record representing a service task, and a display component configured to display service task icons representing the service task records. The display component therefore displays for a user of the facilitator device a set of icons of predominantly pictorial form representing the service tasks to be performed, and thereby facilitates the performance of the service tasks.

FIG. 1 illustrates an exemplary device 10 configured in this manner, comprising a service task icon memory 12 configured to store at least one service task icon 14. The service task icons 14 may be advantageously selected as icons of predominantly pictorial form that visually suggest the service tasks that may be performed as part of the service industry. For example, for a facilitator device 10 configured for facilitating the performance of service tasks in an assisted daily living (ADL) service industry, the service task icon memory 12 may contain service task icons 14 representing a service task for assisting an individual with bathing, assisting an individual with feeding, and laundering an individual's clothing. The exemplary device 10 of FIG. 1 also comprises a service task memory 16 configured to store at least one service task record 18 representing a service task to be performed on behalf of an individual. For example, the exemplary device 10 of FIG. 1 comprises a service task memory 16 containing a service task record 18 representing a bathing assistance service task to be performed on behalf of an individual. The exemplary device 10 of FIG. 1 also comprises a display component 20 configured to display service task icons 14 representing the service task records 18 stored in the service task record memory 16. For example, the display component 20 of the exemplary facilitator device 10 of FIG. 1 may be configured to display the bathing assistance service task icon 14 in order to represent the bathing assistance service task record 18 stored in the service task memory 16. By displaying service task icons of predominantly pictorial form in order to represent the service task records 18, the device facilitates the performance of the service tasks.

A service task facilitator device configured in this manner, such as the exemplary service task facilitator device 10 of FIG. 1, may be used in many scenarios. In one such scenario, which is used in many examples presented herein, the device may be used in a scenario of assistance for daily living (ADL) home healthcare environment. In such a scenario, the service tasks comprise activities of daily living performed on behalf of an assisted living individual, and the activities of daily living comprise at least one of a personal care activity performed on the assisted living individual and an environmental care activity performed on a daily living item of the assisted living individual. However, the device may be similarly used in many other scenarios. For example, a device such as the exemplary service task facilitator device 10 of FIG. 1 may be used in a lodging services industry, such as in a hotel or motel; in this scenario, the service tasks might comprise lodging housekeeping tasks in relation to the lodging service. Many other scenarios may be amenable to the use of the techniques, along with the related devices and systems, such as described herein.

A service task facilitator device configured in this manner, such as the exemplary service task facilitator device 10 of FIG. 1, may also be configured to coordinate such service tasks among many types of users. As one example, the device may be programmed with a set of service task records to be performed by an agent on behalf of an individual, e.g., by a home healthcare assistant who is sent to the residence of a disabled individual; in this scenario, the facilitator may display the icons of predominantly pictorial form in order to remind the agent of the service tasks to be performed. As another example, a plurality of facilitator devices may be programmed with a set of service task records and provided to each individual of a team of agents visiting a site together; in this scenario, each agent carries a device that displays icons as reminders of the agent's service tasks to be performed at the site. As a third example, a facilitator device may be programmed with several sets of service task records, each set to be performed on behalf of an individual or a group of individuals, and/or to be performed at a different location and/or day and time. For example, an agent may carry a facilitator device programmed with service task records representing a week-long agenda of service tasks to be performed at various sites, and on various days, and on behalf of various individuals. The facilitator device may therefore display icons of predominantly pictorial form to remind the agent of the sets of service tasks to be performed at various times. Many other scenarios for using such a facilitator device having a service task icon set of predominantly pictorial form may be devised by those of ordinary skill in the art while implementing the techniques described herein.

A facilitator device of this nature, or a plurality thereof, may be used in conjunction with a service task coordinating system configured to coordinate the performance of service tasks. The service task coordinating system may be devised to coordinate a set of service tasks among a set of facilitator devices in order to organize a team of agents in the performance of a wide variety of service tasks. Moreover, a service task coordinating system of this nature may be configured to communicate with users through a set of icons of predominantly pictorial form to convey the details of the service tasks in a language-independent manner, and may use the same icons as the facilitator devices in order to enhance consistency of communication.

Figure 2:
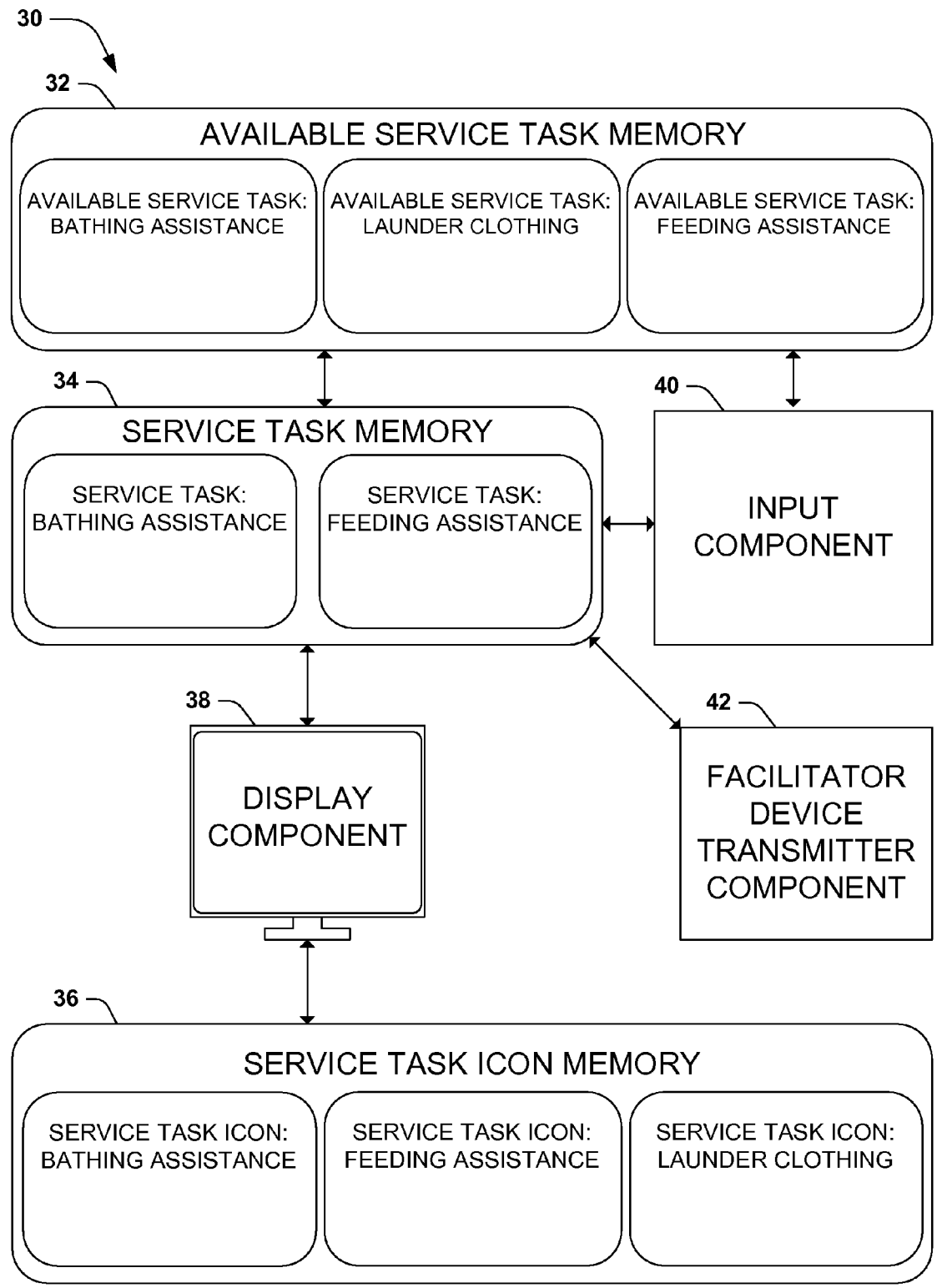
FIG. 2 is a component block diagram of an exemplary service task coordinating system configured to coordinate the performance of service tasks.

FIG. 2 illustrates an exemplary service task coordinating system 30 configured as described herein. The exemplary service task coordinating system 30 of FIG. 2 comprises a number of interoperating components that together provide for the coordination of a set of service tasks among at least one, and up to an indefinite number, of facilitator devices. The exemplary service task coordinating system 30 comprises an available service task memory 32, which is configured to store an available service task record set comprising at least one available service task record representing an available service task. The available service task record set represents the set of service tasks that may be performed in relation to the service industry, e.g., that may be assigned to a user of a facilitator device.

The exemplary system 30 of FIG. 2 also comprises a service task memory 34, which is configured to store at least one service task record representing a service task selected from the available service tasks. The service task memory 34 therefore contains the selected service tasks that are to be performed by users of the facilitator devices. The exemplary system 30 also comprises an input component 40 configured to receive user input comprising a selection of at least one available service task, and configured to store at least one service task record in the service task memory 34 representing the at least one selected available service task.

The exemplary system 30 also comprises a facilitator device transmitter component 42, which is configured to send at least one service task record to at least one service task facilitator device. The facilitator device transmitter component 42 may comprise a hardware component, such as a network communication component (e.g., a modem, a wired or wireless network card, or a Bluetooth™ or similar device) or a direct communication component (e.g., an RS-232 adapter or an infrared adapter) matching a receiving direct communication component on the facilitator device. The facilitator device transmitter component 42 may alternatively or additionally comprise a software component configured to utilize a general-purpose hardware communication component that is accessible to the coordinating system; a software component of this nature may comprise a device driver, a communications API (e.g., a TCP/IP stack simulator), or a software routine to invoke a device driver or communications API in order to communicate with a facilitator device.

The exemplary system 30 of FIG. 2 also comprises a service task icon memory 36, which is configured to store at least one service task icon of predominantly pictorial form representing at least one service task, and a display component 38, which is configured to display service task icons representing the service tasks in the service task memory 34. It may be appreciated that the service task icon memory 36 of this exemplary system 30 may be similar to or the same as the service task icon memory 12 in the exemplary facilitator device 10 of FIG. 1, and may be configured to display the same icons of predominantly pictorial form as the exemplary facilitator device 10 in order to promote the use of the icons to represent the service tasks in a consistent manner. As one example, the display component 38 may be configured to display the icons as a representation of the available service task records stored in the available service task memory 32 while receiving user input as to the service tasks to store in the service task memory 34. As an alternative or additional example, the display component 38 may be configured to display the icons as a representation of the service task records stored in the service task memory 34. As a second alternative or additional example, the display component 38 may be configured to display the icons as a representation of a communication with a facilitator device via the facilitator device transmitter component 42, such as the service task records being sent to a facilitator device and/or stored on a facilitator device.

The components of the exemplary system 30 therefore interoperate to allow a user of the coordinating system to organize service tasks among facilitator devices. More specifically, the exemplary system 30 allows a user to select, from the available service tasks in the available service task memory 32 and using the input component 40, at least one service task to be performed, which is stored as a service task record in the service task memory 34; to view, using the display component 38, the service tasks stored in the available service task memory 32, the service task memory 34, and/or the memory of a facilitator device; and to send, using the facilitator device transmitter component 42, the service task records in the service task memory 34 to at least one facilitator device. Moreover, the exemplary system 30 communicates the service task information with the user predominantly through icons of predominantly pictorial form stored in the service task icon memory 36, which serves to promote comprehension of the service task information in a consistent and language-independent manner.

Figure 3:
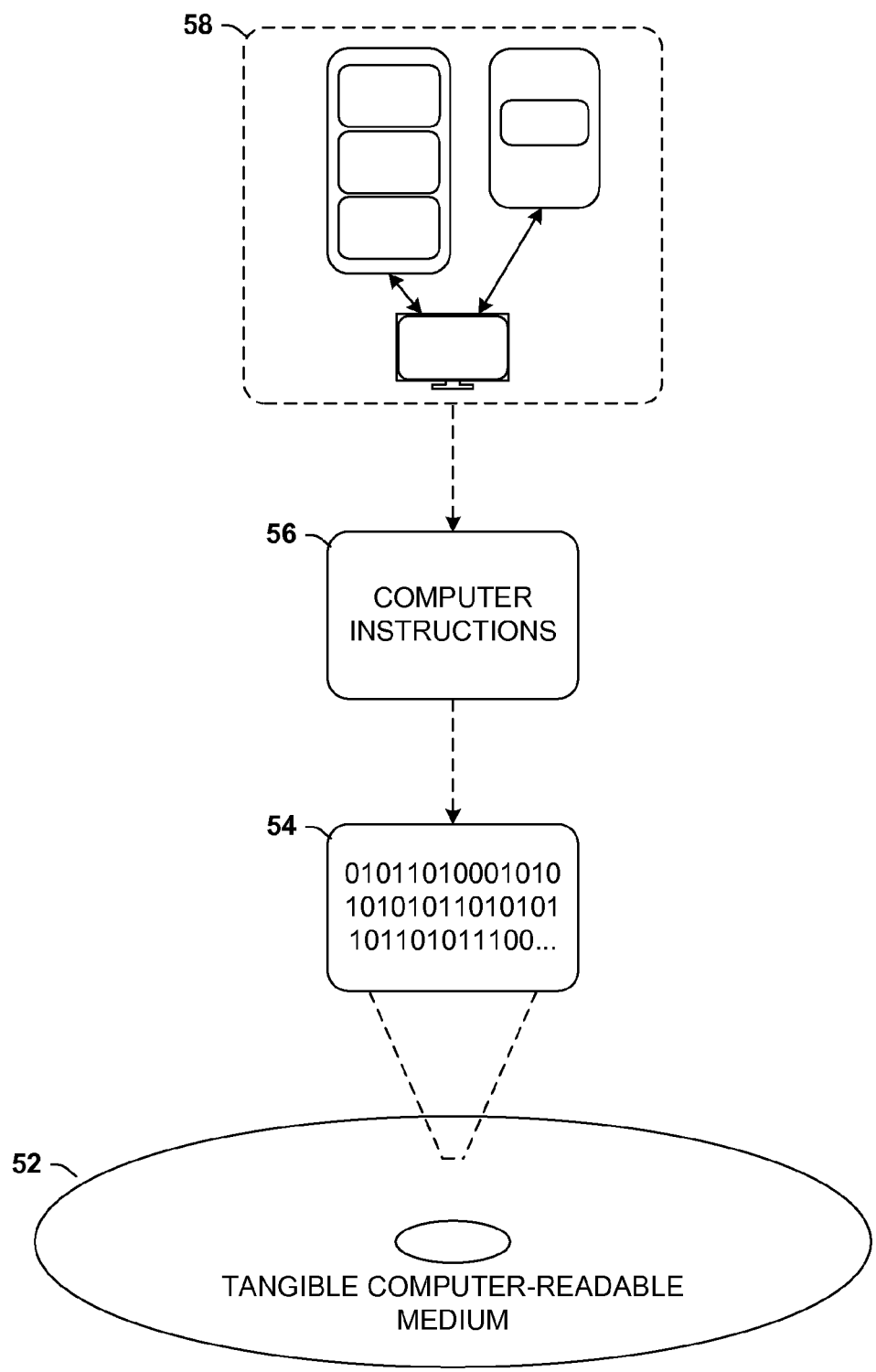
FIG. 3 is an illustration of an exemplary tangible computer-readable medium comprising processor-executable instructions configured to embody the techniques disclosed herein.

Still another embodiment of these techniques involves a tangible computer-readable medium comprising processor-executable instructions configured to apply the techniques presented herein. An exemplary computer-readable medium that may be devised in these ways is illustrated in FIG. 3, wherein the implementation 50 comprises a tangible computer-readable medium 52 (e.g., a CD-R, DVD-R, or a platter of a hard disk drive), on which is encoded computer-readable data 54. This computer-readable data 94 in turn comprises a set of computer instructions 56 configured to operate according to the principles set forth herein. In one such embodiment 50, the processor-executable instructions 56 may be configured to implement a facilitator device, such as the exemplary facilitator device 10 of FIG. 1. In another such embodiment, the processor-executable instructions 56 may be configured to implement a coordinating system, such as the exemplary coordinating system 30 of FIG. 2. Many such computer-readable media may be devised by those of ordinary skill in the art that are configured to operate in accordance with the techniques presented herein.

The techniques described herein and the embodiments thereof (such as the exemplary facilitator device 10 of FIG. 1 and the exemplary coordinating system 30 of FIG. 3) may be implemented in many ways. Some implementations may have variations in some aspects that may present additional advantages and/or reduce disadvantages as compared with other variations of these and other techniques.

Figure 4A:
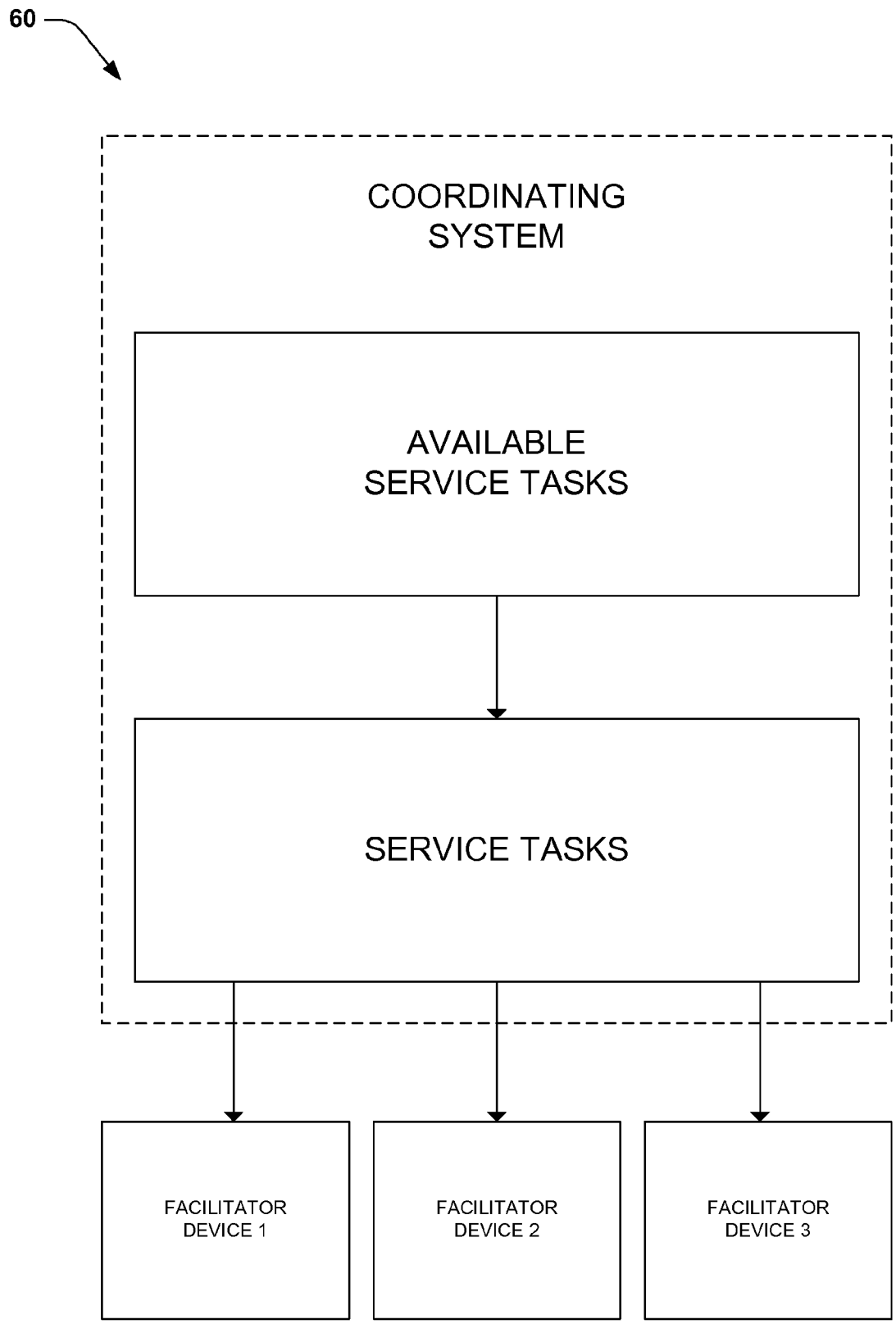
FIGS. 4A-4D are illustrations of exemplary usage patterns of the coordinating system and a set of facilitator devices configured according to the techniques described herein.
Figure 4B:
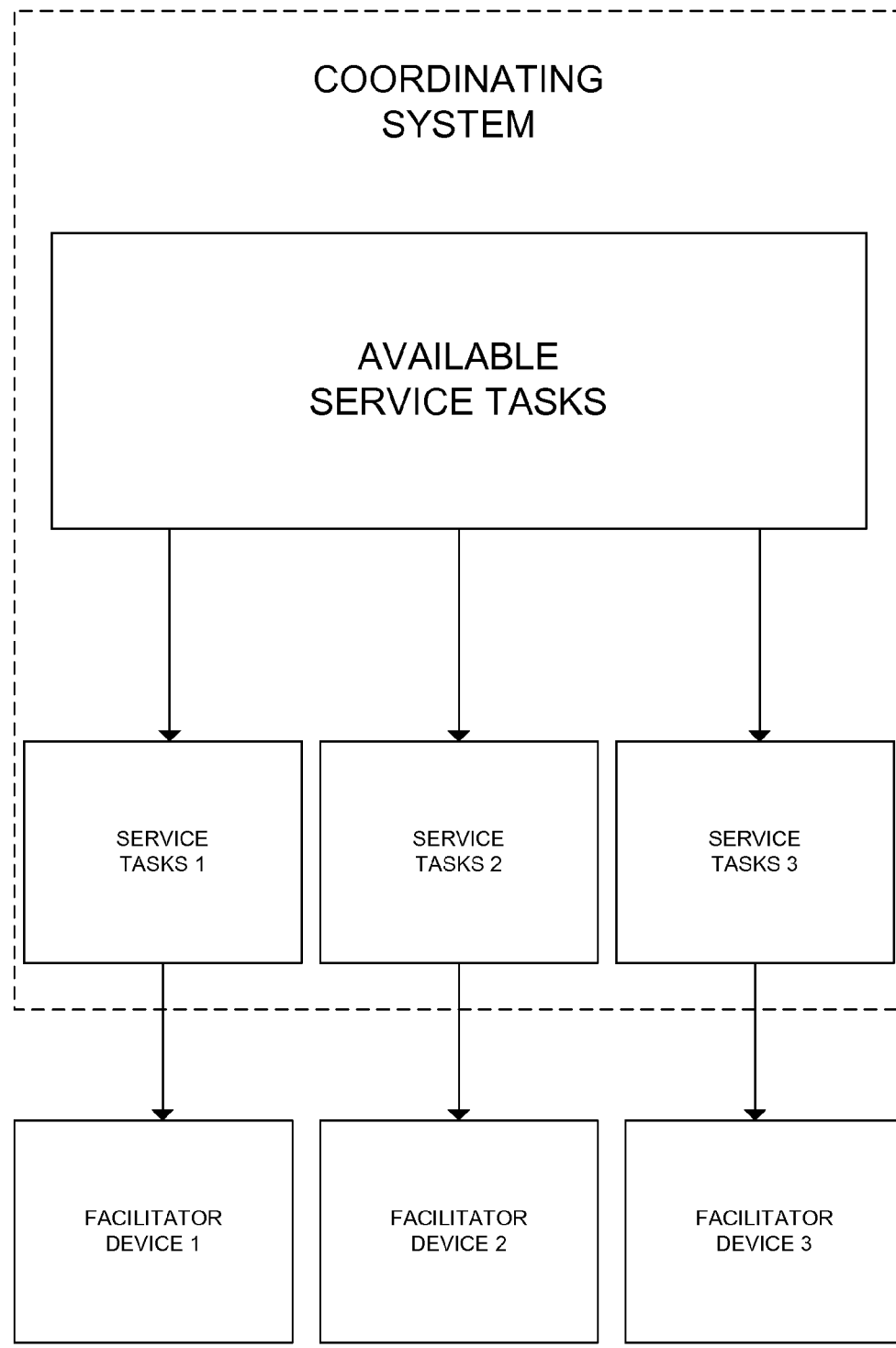

A first aspect that may vary among implementations of these techniques relates to the configuration of the facilitator devices and coordinating systems in view of particular usage patterns of such embodiments. A coordinating system such as the exemplary system 30 of FIG. 2 may be configured to interoperate with facilitator devices in many ways. A couple exemplary usage patterns are shown in FIGS. 4A-4B, each of which illustrates a relationship between available service tasks, one or more service task sets, and one or more facilitator devices. In the first example 60 of FIG. 4A, the user of the coordinating system selects a service task set from the available task set, and the service task set is sent to a plurality of facilitator devices. This usage pattern may be useful to coordinate a set of service tasks among many agents working together, where each agent bears a facilitator device as a reminder of the service tasks. In the second example 70 of FIG. 4B, the user of the coordinating system selects a plurality of service task sets form the available task set, and each service task set is sent to one facilitator device. This usage pattern may be useful where service tasks are parceled into sets of tasks among agents, who may work independently on various service tasks as indicated by each agent's facilitator device. Of course, many other arrangements are possible; for example, each facilitator device may contain both a shared service task set that is also sent to one or more other facilitator devices for team-oriented service tasks and an agent service task set for service tasks allocated only to one agent for independent completion.

Still other usage patterns are shown in FIGS. 4C-4D, each of which again shows a relationship between available service tasks, one or more task sets, and one or more facilitator devices. However, in these examples 80, 90 of FIGS. 4C and 4D, the coordinating system also includes an individual memory, which is configured to store at least one individual record representing at least one individual on whose behalf at least one available service task may be performed. For example, a coordinating system used in an assisted daily living service industry may comprise an individual memory storing individual records representing the individuals who are to be assisted, while a coordinating system used in a lodging services industry may comprise an individual memory storing individual records representing lodging guests. In such coordinating systems, the service tasks may be selected from the available service tasks on behalf of specific individuals, and the service task records stored in the service task memory of the coordinating systems may be related to the individual records stored in the individual memory. Finally, the display component may be configured to display the at least one individual record related to a displayed service task. In this manner, a user of the coordinating system may select service tasks on behalf of various individuals (e.g., clients or customers of the service industry), and the user of the coordinating system may view the service tasks that have been selected for a particular individual. Many other arrangements, uses, and interrelationships of the individual memory in such coordinating systems may be devised by those of ordinary skill in the art while implementing the techniques described herein.

Figure 4C:
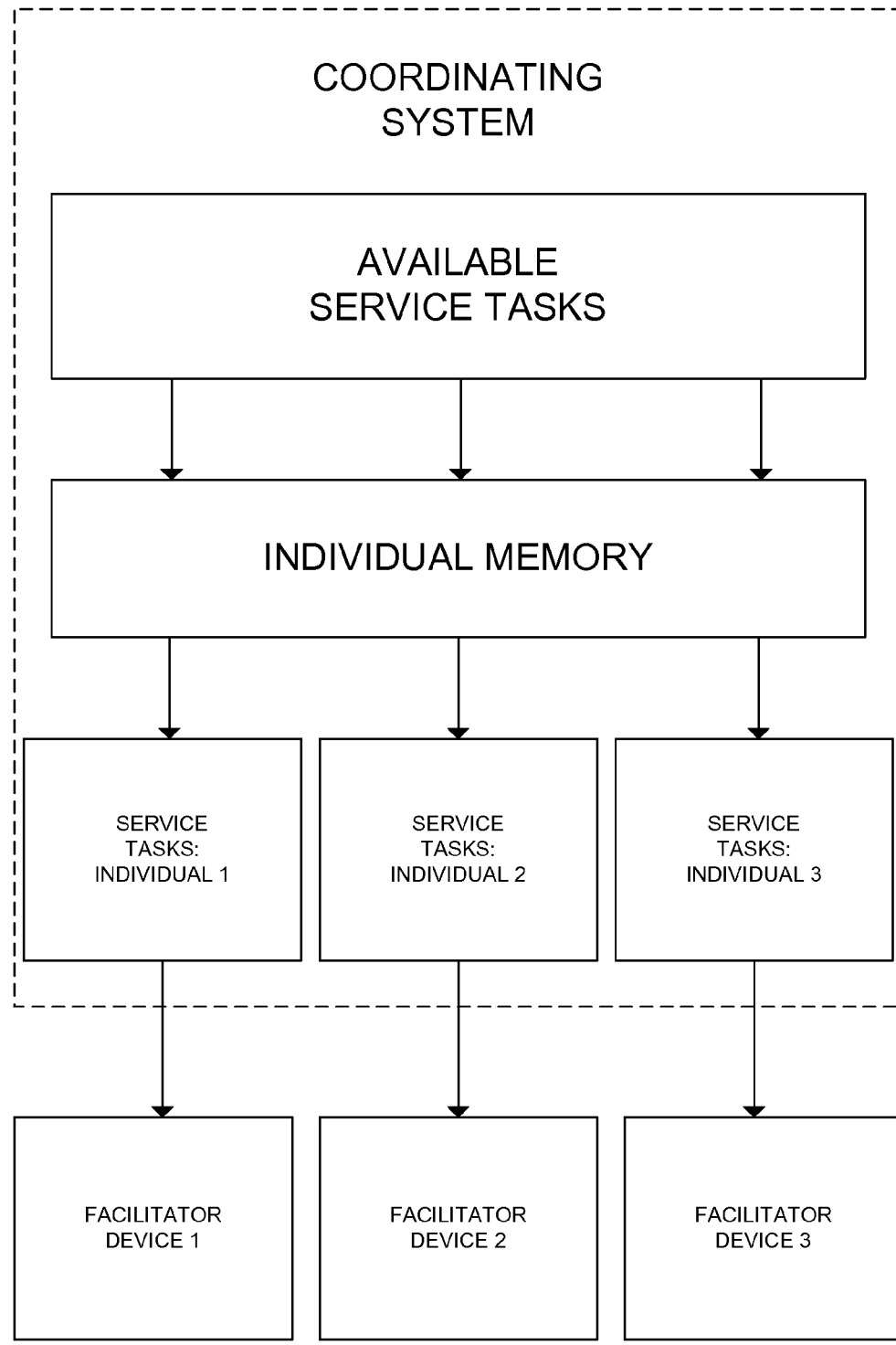
Figure 4D:
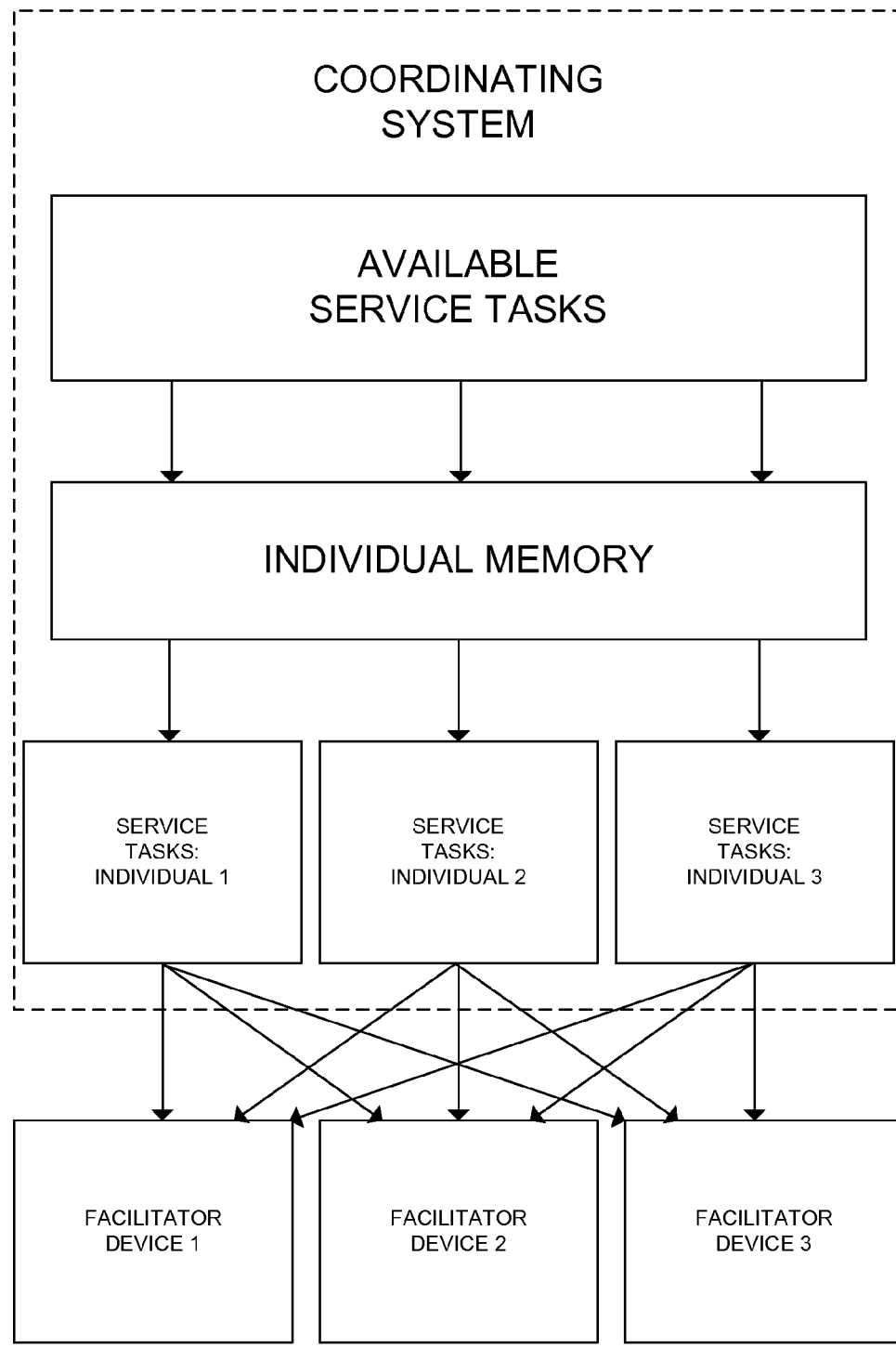

FIGS. 4C-4D illustrate two exemplary coordinating systems 80, 90 that may incorporate and utilize such an individual memory. In the example 80 of FIG. 4C, the coordinating system permits the user to select a set of service tasks from the available service tasks on behalf of the individuals in the individual memory, thereby creating a per-individual service task set. Each facilitator device receives one per-individual service task set, which may be provided to and utilized by an agent on behalf of the individual represented by the per-individual service task set. This scenario may be advantageous, e.g., for an assisted daily living (ADL) scenario, in which an agent may visit a private residence to perform all of the service tasks for the individual resident before moving to another private residence. By contrast, the example 90 of FIG. 4D illustrates a scenario where per-individual service task sets are created, but the facilitator devices receive a plurality of per-individual service task sets. This scenario may be advantageous, e.g., for a lodging services scenario, in which an agent may perform a variety of services on behalf of a variety of individuals. For example, an agent may be assigned the task of providing fresh linens to each individual on a floor of a hotel, and the facilitator device may indicate each of the individuals (e.g., each room) to which fresh linens are to be delivered. Another agent may be assigned an in-room food service task, and the facilitator device for this agent may indicate the meals to be provided to individuals in various rooms. Many such scenarios for creating service task sets and providing them to facilitator devices for use by various agents may be devised by those of ordinary skill in the art while implementing the techniques described herein.

A second aspect that may vary among implementations relates to the configuration of a facilitator device to receive various forms of user input, such as from an agent assigned to perform one or more service tasks on behalf of one or more clients. Thus, rather than serving as simply a reminder device, the facilitator device interacts with the user in tracking the performance of the service tasks. As one example, the facilitator device may comprise an input component configured to receive user input comprising at least one service task, and the service task memory may be configured to store a service task record representing the user input comprising the at least one service task. This example allows a user (such as the agent who will use the facilitator device in the performance of the service tasks to program the facilitator device with the service tasks through user input. In this manner, the facilitator device may be used as a standalone device in the absence of a coordinating system. Alternatively, the facilitator device may be capable of accepting input comprising service tasks both from a coordinating system and from the user in the form of user input, and/or may be configured to allow the user to provide user input for altering the service tasks provided by a coordinating system.

Many types of input components may be included with the facilitator device for receiving user input. As one example, the facilitator device may display a menu system from which the user may select service tasks through an input component comprising one or more buttons, a touchscreen configured to receive touch or stylus input, or orientation input coupled with menu traversal options. As a second example, the input component may comprise a keyboard, through which the user may provide text entry that can be translated into one or more service tasks (e.g., "launder clothing for Nancy Smith.") As a third example, the input component may comprise a handwriting input component coupled with a handwriting recognition component, such that a user may write the names of service tasks that the facilitator device may translate into service task records, or a microphone coupled with a voice recognition component for a similar input mechanism. Many such input components may be included in a facilitator device for receiving user input comprising one or more service tasks.

A second variation of the user input aspect that may vary among implementations (alternatively or additionally with the receipt of user input specifying service tasks) relates to the configuration of the facilitator device to receive user input relating to the performance of a service task. A user of the facilitator device, such as an agent in a service industry, may track the performance of the service task by indicating (through the input component) whether or not the performance task has been attempted, and the success or failure of the attempt. The facilitator device may therefore comprise a service task performance memory configured to store at least one service task performance record that represents the performance input representing the service task. For instance, a user may cycle through the service task records representing service tasks that may be achieved in a time period (e.g., a site visit for a particular individual), and for each service task, the user may indicate whether or not the service task was performed. As one example, the facilitator device may be configured to accept such input by presenting to the user a service task performance option set, which may comprise a complete service task performance option (e.g., "done"), an incorrect service task performance option (e.g., "oops"), and an incomplete service task performance option (e.g., "skipped"). The input component of the facilitator device may be configured to receive a service task performance input that represents a user selection among the service performance options related to the performance of the service task. The service task performance memory of the facilitator device may be configured to store one or more service task performance records representing the selected service task performance option. The facilitator device may optionally transfer the service task performance records to a coordinating system. Again, many types of input components may be devised to offer such user input, such as one or more buttons mapping to a menu system for inputting service task performance information, a keyboard for text input, touchscreen devices for detecting touch or stylus input, handwriting or voice input and recognition devices, etc. The input component may also be configured to receive a device communication representing a performance of a service task, such as a communication from a laundry machine that laundry has been cleaned for a particular individual. Many variations in the configuration of input components of such facilitator devices may be devised for accepting user or device input relating to the performance of one or more service tasks.

A third variation of the user input aspect that may vary among implementations (alternatively or additionally with receipt of user input specifying other items) relates to the configuration of the facilitator device to receive user input relating to alternative methods of performing a service task. For example, a service task may be generally described, and may be performed in at least two manners, as may be determined by (e.g.) the preferences and capabilities of the agent, the preferences and capabilities of the individual on whose behalf the service task is performed, the available equipment, and the circumstances of the service task. Thus, for any particular service task, the facilitator component may present one or more service task alternative performance options, and the user may select one or more service task alternative performances from among the service task performance options to indicate how the service task was accomplished. The selected service task performance options may then be stored as service task performance records. For instance, a service task may direct an agent to facilitate an individual with bathing, but may present the options of a shower, a bath, and a sponge bath. In addition to providing user input representing the performance of the service task, the agent may also provide user input representing the selection of one or more alternative performance options whereby the service task was completed (or at least attempted.) Accordingly, the display component of the facilitator device may be configured to present a service task alternative performance option set comprising at least two alternative performance options for satisfying a service task. The input component of the facilitator device may be configured to receive user input representing a user selection of at least one of the service task alternative performance options, and the service task performance memory configured to store at least one service task alternative performance record representing the selections among the service task alternative performance options. Many variations in the configuration of input components of such facilitator devices may be devised for accepting user input relating to the alternative performance options and selections thereof with respect to a particular service task.

A fourth variation of the user input aspect that may vary among implementations (again, alternatively or additionally with receipt of user input specifying other items) relates to the configuration of the facilitator device to receive user input relating to an annotation of a performance of a service task. In this variation, the input component of the facilitator device is configured to receive user input comprising a service task performance annotation, which may be related to a service task performance record representing the performance of a service task. The facilitator device may also comprise a service task performance annotation memory, which may be configured to store service task performance annotation records representing service task performance annotations and related to service task records. This aspect may permit an agent using the facilitator device to annotate an entry of a service task performance with information that may be difficult to capture otherwise. For instance, an agent may wish to annotate a service task performance record with information about some additional service tasks that may need to be performed in a subsequent visit, or an inability to complete a service task for particular reasons, etc. To this end, the input component of the service task may be configured to receive a user annotation related to a performance of a service task, and the facilitator device may comprise a service task performance annotation memory configured to store at least one service task performance annotation record representing the service task performance annotation and related to the service task record. The input component may again comprise one or more buttons for navigating a menu system (e.g., a list of common annotation comments, such as "fully performed," "incomplete," "unable to perform," "postponed," etc.), a text entry input component such as a keyboard, a touchscreen component for accepting touch or stylus input, a handwriting or voice input component, etc. Those of ordinary skill in the art may devise many forms of input components may be devised for receiving service task annotations associated with performances of service tasks while implementing the techniques discussed herein.

One variation of this aspect that may be particularly advantageous relates to the acceptance of user input through the selection of one or more displayed icons. The facilitator device described herein communicates the service task information to the user through icons of predominantly pictorial form, which may comprise an easily recognizable lexicon related to the context of the service, such as pictographic icons chosen to represent service tasks in a lodging services industry (e.g., icons illustrating a vacuum cleaner, a bed sheet, a set of bathroom linens, a food service cart, etc.) In variations of facilitator device embodiments involving user input, the user may be presented with a series of icons that may be selected by the user to provide input. As one example, in the context of a home healthcare services industry, a facilitator device may be devised that presents service tasks to an agent to be performed on behalf of an individual by displaying a series of icons (e.g., a laundry icon, a bathing icon, and a medication icon.) Moreover, the icons may be selectable through an input component of the facilitator device, such that the agent may select an icon to indicate a successful performance of the represented service task. For instance, the input component may comprise a touchscreen, and an icon may be selectable by human touch to toggle among a few possible outcomes related to its performance (e.g., a "complete" performance indicator, a "skipped" performance indicator, and an "unable to complete" performance indicator.) By utilizing selectable icons of predominantly pictorial form for both the presentation of service task information and the acceptance of user input relating thereto, the facilitator device may present to the user a consistent user interface that functions in an easily understandable and language-independent manner.

Figure 5:
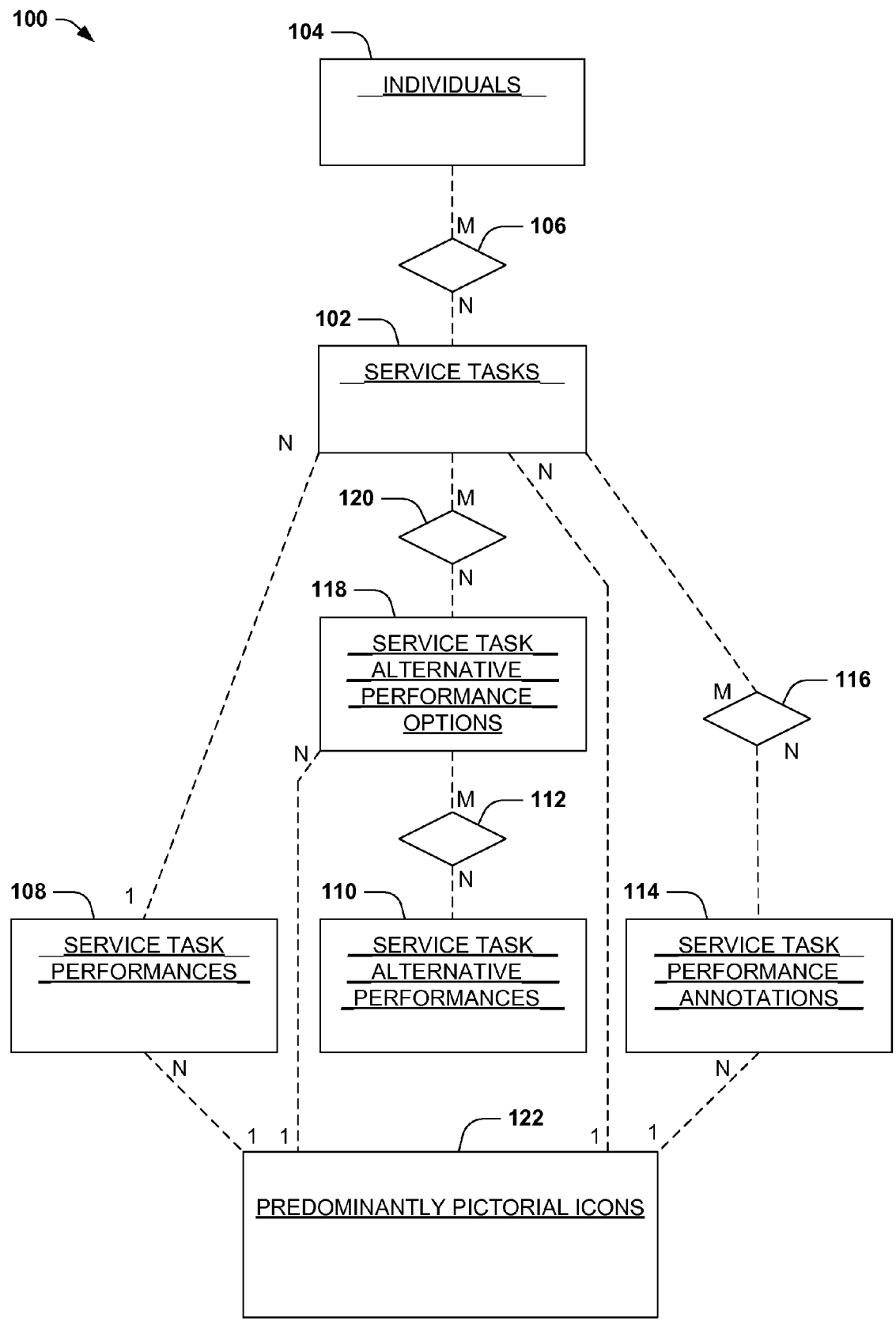
FIG. 5 is a UML diagram depicting an exemplary schema for representing various service task records and relationships therebetween.

The variations of the techniques presented herein involve the tracking of many types of information, which may be stored in a computer memory as one or more records. The storage of the records may comprise (e.g.) a flat file, a well-structured hierarchical document such as an XML document, a relational database, etc. The conceptual relationships among the various types of records may also be formulated according to many schemas imbuing various properties and constraints on the relationships among the records and record types. An exemplary schema 100 is illustrated in FIG. 5, presented in the form of a UML diagram illustrating some of the types of records that may be stored in accordance with these techniques (such as within the service task memory 16 in the exemplary facilitator device 10 of FIG. 1, or the service task memory 34 in the exemplary coordinating system 30 of FIG. 2, etc.) The exemplary schema 100 of FIG. 5 is configured to store (at least) seven types of records: service task records 102 representing service tasks; individual records 104 representing individuals on whose behalf the service tasks represented by the service task records 102 are to be performed; service task performance records 108 indicating whether or not a service task was performed (e.g., selected from a "complete" service task performance, an "incorrect" service task performance, and an "incomplete" service task performance); service task alternative performance option records 118 indicating the various options for performing the service tasks; service task alternative performance records 110 indicating the selected options among the service task alternative performance options related to a performance task, wherein the service task alternative performance records 110 indicate the manner in which a service task was performed (e.g., cleaning a floor by vacuuming, mopping, brooming, etc.); service task performance annotation records 114 containing annotations entered by the user with respect to various service tasks (e.g., "these tasks should be performed with at least two agents"); and predominantly pictorial icons 122 associated with the service task records 102, the service task performance records 108, the service task alternative performance option records 118, and the service task performance annotation records 114.

As presented in the UML diagram for this exemplary schema 100, the various types of records are related in different manners. As one example, the service task records 102 are related to the individual records 104 through an M:N (many-to-many) relationship 106, such that each service task may be related to any number of individuals, and many service tasks may be related to one individual. By contrast, the service task records 102 are related to the service task performance records 108 through a 1:N (one-to-many) relationship, such that each service task record 102 may specify only one service task performance record 108 (e.g., a service task record 102 may not specify both "complete" and "incomplete.") The various types of service task records are also related to the predominantly pictorial icons 122 through a 1:N (one-to-many) relationship, such that each service task record 102, each service task performance record 108, each service task alternative performance option record 118, and each service task performance annotation record 114 is represented by one predominantly pictorial icon 122, but the same icon may be used to represent many records of the same type (e.g., many service task records 102 representing floor cleaning may be represented by the same predominantly pictorial icon 122.) The exemplary schema 100 may also be extended by adding other types of records; for example, the facilitator device and/or coordinating system utilizing this exemplary schema 100 may also add agent records, representing the agents responsible for performing various service tasks, and may be related to the service task records 102 in (e.g.) a many-to-many relationship. Many variations in the types of records stored in such facilitator devices and coordinating systems, and for representing the relationships among such records, may be devised by those of ordinary skill in the art while implementing the techniques discussed herein.

A third aspect that may vary among implementations of these techniques relates to the communication of the facilitator device (such as the exemplary facilitator device 10 of FIG. 1) and the coordinating system (such as the exemplary coordinating system 30 of FIG. 2.) Many types of data may be exchanged between the facilitator device and the coordinating system, and the hardware of these apparatuses may be customized to suit the data exchanged. As a first example, the facilitator device may be configured to receive service tasks from the coordinating system. In this example, the facilitator device may comprise a coordinating system receiver component, which may be configured to receive from a service task coordinating system at least one service task record.

As a second example, the facilitator device may be configured to send service task performance records to the coordinating system following the generation of such records in response to the receipt of user input specifying a performance of a service task. In this example, the facilitator device may comprise a service task coordinating system transmitter component, which may be configured to send to a service task coordinating system at least one service task performance record; and the coordinating system may comprise a facilitator device receiver component configured to receive from a facilitator device at least one service task performance annotation record related to a service task record and representing a performance of a service task.

As a third example, the facilitator device may be configured to receive from the coordinating system a set of service task alternative performance option records specifying the options whereby a related service task may be performed. Accordingly, the coordinating system may comprise a facilitator device transmitter component configured to send to a facilitator device at least one service task alternative performance option records related to the options for satisfying a related service task. Similarly, the facilitator device may comprise a service task alternative performance option memory configured to store service task alternative performance option records related to alternative performance options for a related service task, and a coordinating system receiver component configured to receive from the coordinating system at least one service task alternative performance option record related to a service task record, which may be stored in the alternative performance option memory. The display component of the facilitator device may also be configured to present the service task alternative performance options to the user while displaying a service task performance record. Moreover, the facilitator device may be configured to accept user input representing the selection of one or more service task alternative performance options, and to store the selected service task alternative performance options in a service task alternative performance memory. The facilitator device may also communicate such selections to the coordinating system. In this embodiment, the facilitator device may comprise a coordinating system transmitter component configured to send to the coordinating system at least one service task alternative performance record; similarly, the coordinating system may comprise a facilitator device receiver component configured to receive from a facilitator device at least one service task alternative performance record.

As a fourth example, the facilitator device may be configured to send service task performance annotation records to the coordinating system following the generation of such records in response to the receipt of user input specifying an annotation of a service task performance. In this example, the facilitator device may comprise a service task coordinating system transmitter component, which may be configured to send to a service task coordinating system at least one service task performance annotation record; and the coordinating system may comprise a facilitator device receiver component configured to receive from a facilitator device at least one service task performance annotation record related to a service task record and representing an annotation of a performance of a service task.

The communications transmitter and receiver components described herein may comprise many forms of communication hardware. As one example, the transmitter and receiver may be chosen for the capability of forming a device-to-device link, whereby a facilitator component may directly communicate with a coordinating system. Such device-to-device links may be established by including many types of communication components in the facilitator device and the coordinating system, such as (e.g.) infrared transmitters and receivers, radio transmitter and receivers such as wireless communication devices and Bluetooth communications devices; and wired communication devices, such as RS-232 communications components. As another example, the facilitator device and the coordinating system may communicate with each other through a communications network, such as a wired or wireless computer network (whereby the facilitator device and the coordinating system each contain a wired or wireless computer network adapter), a cellular network (whereby the facilitator device and the coordinating system each contain a cellular communications device.) Many such communications schemes may be devised by those of ordinary skill in the art while choosing the communications configurations of the facilitator device and the coordinating system while implementing the techniques discussed herein.

A fourth aspect that may vary among implementations of these techniques relates to the interoperation of the devices disclosed herein (such as the exemplary facilitator device 10 of FIG. 1 and the exemplary coordinating system 30 of FIG. 2) with other devices and systems in related technologies. As a first example, the facilitator devices and/or coordinating systems may be integrated with a medicament reminder device, such as disclosed in U.S. patent application Ser. No. 11/712,376 (filed Feb. 28, 2007) entitled "Device for Facilitating Compliance with Medication Regimen," and/or a medicament reminder method, such as disclosed in U.S. patent application Ser. No. 11/712,357 (filed Feb. 28, 2007) entitled "Method for Facilitating Compliance with Medication Regimen." The entirety of both patent applications (except the claims) is incorporated by reference as if fully set forth herein. For instance, the service tasks that are coordinated as discussed herein may include a service task involving the assistance of an individual with the provision of medicaments, such as prescription medications, and the regimen for such provided medicaments may be described in a medicament reminder system or device. The medicament reminder system or device may also communicate back with the service task facilitator devices and coordinating systems, such as to provide a service task performance record indicating the completion, incorrect completion, or incompletion of a service task comprising a medicament regimen.

As a second example, the facilitator devices and/or coordinating systems may be integrated with a method of representing a health state of an individual, such as disclosed in U.S. patent application Ser. No. 11/753,306 (filed May 24, 2007) entitled "Health Information Hierarchical Classification Scheme and Methods and Systems Related Thereto," the entirety of which (except the claims) is incorporated by reference as if fully set forth herein. For instance, assessing the health state of an individual may involve measuring the performance of an individual in performing various tasks, such as the capability of the individual in walking outdoors on uneven ground. The assessment may therefore be formulated as a service task, which may be performed (e.g.) by a home healthcare assistant during a visit to the individual. Moreover, the service task performance record (or related records, such as the service task performance annotation record) may conform with the health information hierarchical classification scheme used in the representation of the health state of the individual, and the service task records stored according to this format may be more easily transmitted to systems configured to receive and store information describing the health state of the individual according to the health information hierarchical classification scheme.

As a third example, the facilitator devices and/or coordinating systems may be integrated with an automated correlational health diagnosis method, such as disclosed in U.S. patent application Ser. No. 11/858,764 (filed Sep. 20, 2007) entitled "Automated Correlational Health Diagnosis," the entirety of which (except the claims) is incorporated by reference as if fully set forth herein. For instance, a home healthcare assistant may be requested to take certain measurements at certain time points that may facilitate the diagnosis of the health state of the individual, such as the measurement of the individual's temperature or heart rate. The service task facilitator device and/or service task coordinating system may record such information in a service task record (or related records, such as the service task performance annotation record) and may transmit such information to a computer system configured to perform an automated correlational diagnosis of the health state of the individual. Moreover, the diagnosis of the health state of the individual may lead to the recommendation of some treatment options, such as (e.g.) the provision of medicaments according to a medicament regimen, the changing of wound dressings, or the ongoing monitoring of particular health metrics (e.g., ongoing monitoring of temperature.) These treatment recommendations may be represented as service task records that may be sent to a service task facilitator device and/or service task coordinating system to facilitate the performance of the recommended treatments by a healthcare agent, such as a home healthcare assistant. Those of ordinary skill in the art may be able to devise many techniques for integrating the service task facilitator devices and/or service task coordinating systems disclosed herein with other service-related devices, systems, and methods, such as those described hereinabove.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A service task facilitator device configured to facilitate performance of service tasks respectively presenting at least two alternative service task performances according to a user preference of a user, the device comprising:
   a service task icon memory configured to store, for respective service tasks, at least one service task icon of predominantly pictorial form representing the service task;
   a service task memory configured to store at least one service task record representing a service task;
   a display component configured to, for respective service tasks:
      display a service task icon representing the service task and respective performed service tasks in the service task records; and
      concurrently display at least two service task alternative performance option icons representing alternative service task performances of the service task selectable by the user for the performance of the service task;
   an input component configured to:
      receive input representing a performance of a performed service task according to a selected alternative service task performance for the service task according to a user preference of the user, and store in the service task memory, associated with the performed service task, at least one service task performance record including the selected alternative service task performance.

2. The device of claim 1, the service tasks comprising activities of daily living performed on behalf of an assisted living individual, and the activities of daily living comprising at least one of a personal care activity performed on the assisted living individual and an environmental care activity performed on a daily living item of the assisted living individual.

3. The device of claim 1, the service tasks comprising lodging housekeeping tasks in relation to a lodging service.

4. The device of claim 1, comprising:
an individual memory configured to store at least one individual record representing at least one individual on whose behalf at least one available service task may be performed; and
the display component configured to display the at least one individual record related to a displayed service task.

5. The device of claim 1, comprising:
an input component configured to receive user input comprising at least one service task,
the service task memory configured to store a service task record representing the user input comprising the at least one service task.

6. The device of claim 1, comprising: a coordinating system receiver component configured to receive from a service task coordinating system at least one service task record.

7. The device of claim 1, comprising:
an input component configured to receive user input comprising a performance of the at least one service task; and
a service task performance memory configured to store at least one service task performance record representing the performance input representing the at least one service task.

8. The device of claim 7:
the display component configured to receive user input representing a service task performance option set comprising at least a complete service task performance option, an incorrect service task performance option, and an incomplete service task performance option;
the input component configured to receive a service task performance input representing a user selection among the service performance options related to the performance of the service task; and
the service task performance memory configured to store at least one service task performance record representing the selected service task performance option.

9. The device of claim 7, comprising: a service task coordinating system transmitter component configured to send to a service task coordinating system at least one service task performance record.

10. The device of claim 7:
the input component configured to receive user input comprising a service task performance annotation related to a service task performance record representing the performance of a service task; and
the device comprising: a service task performance annotation memory configured to store at least one service task performance annotation record representing the service task performance annotation and related to the service task record.

11. The device of claim 10, comprising: a coordinating system transmitter component configured to send to the coordinating system at least one service task performance annotation record.

12. A service task coordinating system configured to coordinate the performance of service tasks according to at least two alternative service task performances according to a user preference of a user, the system comprising:
a service task icon memory configured to store at least one service task icon of predominantly pictorial form representing at least one service task;
an available service task memory configured to store an available service task record set comprising at least one available service task record representing an available service task;
a service task memory configured to store at least one service task record representing a service task selected from the available service tasks;
a display component configured to display, for respective service tasks:
display a service task icon representing the service task in the service task memory; and
concurrently display at least two service task alternative performance option icons respectively representing alternative service task performances of the service task selectable by the user for the performance of the service task;
an input component configured to, upon receiving user input comprising a selection of at least one available service task according to a selected alternative service task performance for the service task according to a user preference of a user, store at least one service task record in the service task memory representing the at least one selected available service task and including the selected alternative service task performance;
a second device input component configured to:
receive a device communication from the second device, the device communication representing a performance of a performed service task that has been detected by the second device, and
store in the service task memory, associated with the performed service task, at least one service task performance record; and
a facilitator device transmitter component configured to send at least one service task record to at least one service task facilitator device.

13. The system of claim 12,
the input component configured to receive user input comprising a service task annotation related to a service task record representing a service task, and
the system comprising: a service task annotation memory configured to store a service task annotation record representing the service task annotation related to the service task record.

14. The system of claim 12, comprising:
an individual memory configured to store at least one individual record representing at least one individual on whose behalf at least one available service task may be performed;
the display component configured to display the individual records while displaying the available service task set;
the service task input component configured to receive user input comprising a selection of at least one individual record representing the individuals on whose behalf the selected service tasks are to be performed; and
the service task memory configured to relate the service task records to the individual records.

15. The system of claim 12, comprising:
a facilitator device receiver component configured to receive from a facilitator device at least one service task performance annotation record related to a service task record and representing a performance of a service task; and a service task performance annotation memory configured to store the service task annotation record received from the facilitator device.

16. The system of claim 15, comprising:

an available service task alternative performance memory configured to store available service task alternative performance records related to at least two alternative performance options related to a service task;

the display component configured to present the available service task alternative performance options while displaying an available service task performance record;

the service input task configured to receive user input comprising a selection of at least one available service task alternative performance option related to the service task;

the service task memory configured to store at least two service task alternative performance records representing the selected service task alternative performance options related to a service task record; and the facilitator device transmitter component configured to send the at least two service task alternative performance records to the at least one service task facilitator device.

17. The system of claim 16, the facilitator device receiver component configured to receive from a facilitator device at least one service task alternative performance record related to a selected service task alternative performance option related to a service task, and the service task performance memory configured to store the at least one service task alternative performance record related to the service task.

18. A computer-readable medium comprising processor-executable instructions configured to implement the system of claim 12.

* * * * *